HEAT SINK MATERIAL AND APPLICATIONS THEREOF

Filed June 30, 1965

INVENTOR
JOHN H. SCHROEPPEL
BY Alberts, Brezina & Lund
ATTORNEYS

United States Patent Office 3,284,606

Patented Nov. 8, 1966

3,284,606
HEAT SINK MATERIAL AND APPLICATIONS THEREOF

John H. Schroeppel, 108 Fairwood Drive, Lemont, Ill.

Filed June 30, 1965, Ser. No. 468,375
16 Claims. (Cl. 219—86)

This invention relates to a heat sink material and applications thereof, and more particularly to a material which is highly advantageous in systems wherein a work piece or other element is heated by passage of electrical current therethrough.

The material of this invention has a variety of applications but was evolved with the general object of improving the operation of a parallel gap electrical welder used in effecting electrical connections in miniaturized electronics. Such a parallel gap welder may be used, for example, in welding a metal strip to a metal layer on the surface of a printed circuit board. In particular, a pair of electrodes spaced a few hundredths of an inch apart may be engaged with the metal strip and connected to a source of electrical current, to cause passage of the current through the strip and also through the underlying layer, to melt the strip and a portion of the layer and to fuse the two together. Preferably, the current source applies a pulse of short duration but of high intensity.

Such parallel gap electrical welders are apt to be erratic in operation, and the welds obtained are not uniform. A particularly troublesome problem is that the welds sometimes have very thin cracks which are not readily visible, even when magnified, but which render the welds unsatisfactory.

Prior to the present invention, I discovered that the operation of a parallel gap welder could be substantially improved by providing a member between the electrodes having a face engaging the metal strip and having the side surfaces thermally bonded to the adjacent sides of the electrodes. With the additional member, heat was subtracted from the surface of the work piece, and there was an improved tendency to produce the melting of the metals at the junction between the surface of the metal strip and the underlying layer.

It has been found, however, that the operation with the additional member is still somewhat critical, and that it is difficult to obtain uniform results.

The present invention is based in part upon the discovery that with the previous development, having the additional member between the electrodes, a current path is provided through the additional member to cause heating thereof and to reduce its effectiveness in subtracting heat from the surface of the work piece. In particular, current can flow from one electrode into the work piece and thence from the work piece to the additional member, thence from the additional member and through the work piece to the other electrode.

According to this invention, a heat sink material is provided having a high thermal conductivity in one direction while having a very low electrical conductivity in the transverse direction.

In accordance with a specific feature of the invention, such a heat sink material is disposed between the electrodes of a parallel gap welder, and is arranged to provide high thermal conductivity in a direction transverse to the surface of the work piece, while having a low electrical conductivity in a direction parallel to the surface of the work piece. With this arrangement, electrical current flow through the material is minimized, while at the same time it efficiently conducts heat away from the surface of the work piece, to thereby minimize heating of the surface portion of the work piece and to obtain a temperature gradient such that the heating is concentrated in an interior portion of the work piece, wherein the welding operation is to take place.

In accordance with a specific feature of the invention, the heat sink material comprises a multiplicity of metallic members, at least three and preferably more, in parallel side-by-side relation and forming continuous paths for conduction of heat in one direction, but with a relatively high electrical resistance between facing surfaces of the multiplicity of metallic members, so as to provide low electrical conduction in a transverse direction.

In one preferred embodiment, the metal members forming the heat sink material are in the form of flat sheets, while in another preferred embodiment, the metallic members are in the form of thin elongated fibers or wires packed tightly together.

Preferably, thin layers of insulating material may separate the facing surfaces of the metallic members, although in some cases it is possible to rely upon the electrical contact resistance, when a sufficient number of metallic members are used and when the requirement as to electrical conductivity is not stringent.

Additional features of the invention relate to various applications of the heat sink material in parallel gap electrical welders, or similar types of electrical welders, to the use of the heat sink material in a mold for electro-forging metal parts, and in the use of the material to increase the power handling capabilities of semiconductor devices.

This invention contemplates other objects, features and advantages which will become more fully apparent from the following detailed description taken in conjunction with the accompanying drawings which illustrate preferred embodiments and in which.

Figures 1, 2, 3, 4, 5, 6, 7, 8, 9, 10:
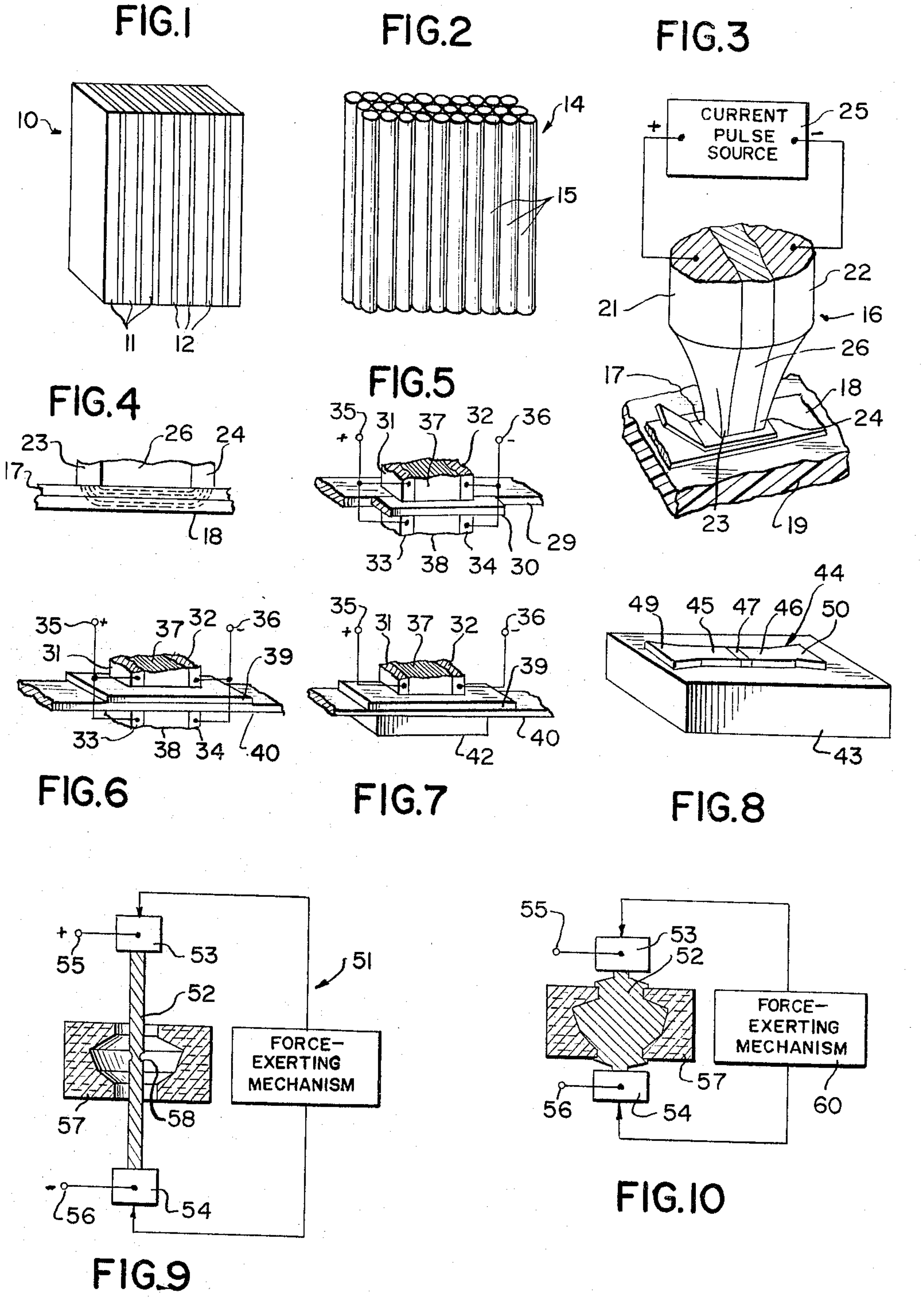
FIGURE 1 is a perspective view of a block of heat sink material constructed according to the invention.
FIGURE 2 is a perspective view of a block of a modified form of heat sink material constructed according to the invention.
FIGURE 3 is a perspective view of a parallel gap electric welder using heat sink material in accordance with this invention, and shown in use in welding a metal strip to a metal layer on a printed circuit board.
FIGURE 4 is an enlarged side elevational view of an end portion of electrode structure of the welder of FIGURE 3, showing diagrammatically the current distribution within the metal strip and metal layer.
FIGURE 5 is a perspective view showing end portions of two pairs of electrodes with heat sink material between electrodes of each pair, used in welding edges of thin sheets together.
FIGURE 6 is a perspective view showing the same electrode arrangement shown in FIGURE 5, used in welding together surfaces of superimposed metal strips.
FIGURE 7 is a perspective view showing another arrangement for welding surfaces of superimposed metal strips, using heat sink materials between a pair of electrodes on one side, and using heat sink material alone on the other side.
FIGURE 8 is a perspective view showing the use of heat sink material in connection with a semiconductor device.
FIGURE 9 is a cross-sectional and diagrammatic view of a system for electro-forging using the heat sink material of this invention, with parts illustrated in an initial condition before application of electrical current and mechanical force.
FIGURE 10 is a view like FIGURE 9 but showing the parts in a condition after application of electrical current and mechanical force.

Referring to FIGURE 1, reference numeral 10 generally designates a block of heat sink material constructed according to the invention, comprising flat metal plates or sheets 11 in parallel relation. This arrangement provides high heat conductivity in a vertical direction and one horizontal direction, but a relatively high electrical resistance is provided between facing surfaces of the metal sheets 11, so as to provide a low electrical conductivity in a horizontal direction transverse to the direction of high heat conductivity. As illustrated, sheets 12 of a material having a high electrical resistance are interleaved between the metal sheets 11, to insure a high electrical resistance in a horizontal direction transverse to the direction of high heat conductivity.

FIGURE 2 illustrates a block of heat sink material 14 which comprises thin elongated metal fibers or wires 15 packed tightly together, to provide continuous heat conduction paths and high heat conductivity in a vertical direction, while providing low electrical conductivity in a horizontal direction. Preferably, the wires 15 may be separated by electrical insulating material which may also serve to bind the wires together. A ceramic cement may be used, for example.

Referring to FIGURE 3, reference numeral 16 generally designates a parallel gap electrical welder which is illustrated in use in welding a metal strip 17 to a metal layer 18 on a substrate or printed circuit board 19. By way of example, the strip 17 may be gold plated kovar and the layer 18 may be a copper portion remaining on the board 19 after etching in accordance with known printed circuit techniques.

The welder 16 comprises a pair of electrodes 21 and 22 which are tapered down to end portions 23 and 24 of reduced cross-sectional area, engaged with spaced surface areas of the strip 17. As diagrammatically illustrated, the electrodes 21 and 22 are connected to a current pulse source 25 which operates to apply a current pulse of high intensity but of short duration for rapidly heating, melting and fusing engaged surface portions of the strip 17 and layer 18.

According to this invention, a member 26 is disposed between the electrodes 21 and 22 and has an end surface in engagement with the strip 17, the member 26 being of a heat sink material such as illustrated in FIGURE 1 or FIGURE 2. The material is so oriented that the high heat conductivity is obtained in a vertical direction, perpendicular to the surface of the strip 17, while having low electrical conductivity in a horizontal direction, extending between the electrodes 21 and 22. By way of example, the heat sink material forming the member 26 may comprise alternate sheets or layers of 0.002 inch thick copper and lens paper saturated with an epoxy cement, with a total thickness of 0.1 inch, the electrode end portions 23 and 24 being about 0.032 inch wide and 0.050 inch in depth.

As shown diagrammatically in FIGURE 4, this arrangement produces a generally uniform current distribution through the strip 17 and layer 18. It will be observed that if the member 26 were of a solid metal material, a current path would be provided from the electrode end portion 23 into the strip 17 thence from the strip 17 into the member 26 thence from the member 26 back into the strip 17 and thence to the electrode end portion 24. With such a current path, the end portion of the member 26 would be heated and there would be an increased current in the surface portion of the metal strip 17, so as to produce a tendency for melting at the surface of the strip 17, rather than in the region of the engaged surfaces of the strip 17 and the layer 18, as would be desired. However, with the member 26 being of the heat sink material of this invention, having a low electrical conductivity in a direction parallel to the surface of the strip 17, the current distribution is substantially uniform. At the same time, with the high heat conductivity of the member 26 in a direction perpendicular to the surface of the strip 17, the surface portion of the strip 17 cannot be rapidly heated. As a result, when the current pulse is applied to the electrodes 21 and 22, the melting is confined to the region of the interengaged surfaces of the metal strip 17 and layer 18, to there produce a solid fusion of the metal thereof.

In the above illustration it is assumed that the strip 17 and layer 18 have about the same electrical conductivity, but it will be appreciated that the current distribution will change if their conductivities are different. For example with the strip 17 being of gold-plated kovar and the layer 18 being of copper the current will be concentrated in the copper because of its lower resistivity. In this case, the use of the heat sink material of this invention produces an even greater advantage in that if the member 26 were of solid metal having a low electrical resistivity parallel to the surface of the strip 17, high current densities and "hot spots" would be produced in the strip 17 in areas underlying the inner surfaces of the electrode end portions 23 and 24. Such hot spots are avoided by use of the heat sink material of this invention.

It should also be noted that since the heat sink material of this invention serves to concentrate the heating in the region to be melted, it is possible to use a much shorter current pulse and to thereby reduce overall heating, with a higher efficiency and less possibility of damage to connected parts. Furthermore, it is possible to use a larger spacing between electrodes and to produce a longer and stronger weld without producing voids or blow points.

FIGURE 5 illustrates an arrangement for welding together abutting edges of a pair of metal strips or plates 29 and 30. In this arrangement, a first pair of electrodes 31 and 32 are disposed in spaced relation along the boundary defined by the abutting edges of the plates 29 and 30, with each electrode extending across the boundary to engage surface portions of both plates. A second pair of electrodes 33 and 34 are disposed in alignment with the electrodes 31 and 32 to engage lower or opposite side of the plates 29 and 30. As diagrammatically illustrated, electrodes 31 and 33 are connected to a terminal 35 which may be connected to the positive terminal of a current pulse source, while terminals 32 and 34 are connected to a terminal 36 for connection to the negative terminal of the source. Thus, current flows in the plates 29 and 30 in a direction parallel to the abutting edges thereof and with sufficient current, the metal is melted to fuse the edge portions of the plates together.

In accordance with this invention, a heat sink member 37 is disposed between electrodes 31 and 32 and a second heat sink member 38 is disposed between electrodes 33 and 34, for engagement with opposite surfaces of the plates 29 and 30. Such heat sink members may be constructed as shown in FIGURE 1 or FIGURE 2 and operate in generally the same manner as in the arrangement of FIGURE 3, with a low electrical conductivity in a direction parallel to the surfaces of the plates 29 and 30 and with a high heat conductivity in a direction perpendicular to such surfaces. As a result melting is confined to a region inwardly from the surfaces of the plates 29 and 30 and a solid weld is obtained along the abutting edges of the plates.

FIGURE 6 illustrates the use of the electrodes 31–34 and heat sink members 37 and 38 in welding a pair of plates 39 and 40 disposed in superimposed relation, one flat against the other. Here again the heat sink members operate to transmit heat away from the surfaces of the plates to confine melting to the region of the interengaged surfaces of the plates 39 and 40.

FIGURE 7 illustrates an arrangement similar to that of FIGURE 6, operative to weld the plates 39 and 40 in superimposed relation, but with the electrodes 33 and 34 and the heat sink member 38 replaced by a heat sink member 42. The operation of this arrangement is thus similar to that of FIGURE 3, except that the heat sink member 42 operates to conduct heat away from the lower surface of the plate 40 while having a low electrical conductivity in a direction parallel to the surface, to prevent the development of "hot spots" except in the region of the interengaged surfaces of the plates 39 and 40.

FIGURE 8 illustrates an arrangement using a heat sink member 43 in conjunction with a semiconductor device 44. The device 44 comprises members 45 and 46 of P and N type materials with a juncture 47 therebetween and with contact portions 49 and 50 secured integrally to the members 45 and 46. The heat sink member 43 may have a construction as illustrated in FIGURE 1 or in FIGURE 2 and operates to provide a high heat conductivity in a direction transverse to the plane of the device 44 to rapidly conduct heat away therefrom while providing low electrical conductivity in a direction parallel to the plane of the device 44 so as not to interfere with the electronic operation thereof. If desired, the heat sink member 43 may have its lower end fused directly to a metal block or bolt and, to insure proper operation of the device 44, the member 43 may be made of heat conductive fibers insulated from one another and having lenghts shorter than the depth of the member 43. By way of example, insulated fibers may be obtained by heating a conglomerate mass of glass and platinum powders and heating and drawing it out to elongate the platinum in the direction of drawing.

FIGURE 9 diagrammatically illustrates an electroforging system 51 wherein an elongated member 52 of metal to be forged is placed between two electrodes 53 and 54 connected to terminals 55 and 56 for connection to positive and negative terminals of a current pulse source. The member 52 extends through a die 57 formed of the heat sink material of this invention and may preferably be provided with a notch 58 within the die 57 to there reduce the cross-sectional area thereof and to insure that initial melting of the member 52 will start within the die, upon application of a current pulse. During application of the pulse, the electrodes 53 and 54 are moved toward each other by means of a force-exerting mechanism 60 and after completion of the operation the metal of the member 52 completely fills the die 57 as illustrated in FIGURE 10. The die 57 may be made in two parts separable to remove the forged member. In accordance with this invention, the die 57 has a high heat conductivity in a direction transverse to the direction of current flow and a low electrical conductivity in a direction parallel to the direction of current flow. With this arrangement, no appreciable current can flow in the die and rapid cooling of the outer surface of the forged member is obtained while heat is still being developed in an interior region, so as to insure a sound forging. The arrangement is of course particularly advantageous in the forging of small parts but can be used for larger parts as well.

It will be appricated that the invention can be applied in applications other than those illustrated and described, and more particularly, in any application wherein it is desired to cool the surface of a work piece through which current is passed, the term work piece being used in a generic sense to include any material or device which includes one or more members providing a path for flow of current and presenting a surface for engagement with the heat sink material. It will be appreciated also that the surface so presented need not be planar but can be curved or of irregular shape.

It will be understood that modifications and variations may be effected without departing from the spirit and scope of the novel concepts of this invention.

I claim as my invention:

1. In electrical apparatus wherein current is passed through a portion of a work piece to heat an internal zone thereof, heat sink material for engaging a surface area of said portion of the work piece disposed generally parallel to current flow in said portion to conduct heat away from said surface area and to produce a positive temperature gradient inwardly from said surface area to said internal zone, said heat sink material having high heat conductivity in a direction transverse to said surface area and low electrical conductivity in a direction generally parallel to said surface area.

2. In apparatus as defined in claim 1, wherein said work piece includes metal members to be fused together, electrodes for engaging points of said work piece on opposite sides of said surface area for passing said current therethrough.

3. In apparatus as defined in claim 1, said work piece being in the form of a semiconductor device.

4. In a heat sink material, a multiplicity of metallic members in parallel side-by-side relation for defining continuous paths for conduction of heat in one direction, with a relatively high electrical resistance between facing surfaces of said metallic members to provide low electrical conductivity in a tranverse direction.

5. In a heat sink material as defined in claim 4, said metallic members being in the form of thin sheets.

6. In a heat sink material as defined in claim 4, said metallic members being in the form of thin elongated wires.

7. In electrical apparatus for treating a work piece, means for passing current through a portion of the work piece for heating and melting an internal zone thereof, and heat sink material for engaging a surface area of said portion of the work piece disposed generally parallel to current flow in said portion to conduct heat away from said surface area and to produce a positive temperature gradient inwardly from said surface area to said internal zone, said heat sink material comprising a plurality of metallic members in parallel side-by-side relation having ends engaged with said surface area and forming continuous paths for conduction of heat away from said surface area, with a relatively high electrical resistance between facing surfaces of said metallic members to provide low electrical conductivity in a direction generally parallel to said surface.

8. In an electric welder, a pair of electrodes for engaging spaced portions of a work piece to pass current therethrough, and heat sink material disposed between said electrodes for engagement with a surface area of said work piece between said spaced portions thereof, said heat sink material having a high heat conductivity in a direction transverse to said surface area and a low electrical conductivity in a direction parallel to said surface area.

9. In an electric welder, a first pair of electrodes for engaging spaced portions on one side of a work piece, a second pair of electrodes aligned with said first pair of electrodes for engaging spaced portions on an opposite side of the work piece, means for passing current through the work piece from one electrode of each pair to the other, and heat sink material disposed between each pair of electrodes for engaging surface areas on opposite sides of the work piece, said heat sink material having a high heat conductivity in a direction transverse to said surface areas and a low electrical conductivity in a direction parallel to said surface areas.

10. In an electric welder as defined in claim 9, said work piece comprising a pair of plates having abutting edges defining a boundary generally parallel to current flow between said electrodes.

11. In an electric welder as defined in claim 9, said work piece comprising a pair of superimposed plates having interengaged surfaces parallel to current flow between said electrodes.

12. In an electric welder, a pair of electrodes for engaging spaced portions on one side of a work piece to pass current therethrough, and heat sink material engaged with a surface area on the opposite side of said work piece parallel to current flow therethrough, said heat sink material having a high heat conductivity in a direction transverse to said surface area and a low electrical conductivity in a direction parallel to said to said surface area.

13. In electrical apparatus for treating a work piece, means including a current source for passing a unidirectional current through a portion of the work piece for heating and melting an internal zone thereof, and heat sink material for engaging a surface area of said portion of the work piece disposed generally parallel to current flow in said portion to conduct heat away from said surface area and to produce a positive temperature gradient inwardly from said surface area to said internal zone, said heat sink material comprising a plurality of metallic members in parallel side-by-side relation having ends engaged with said surface area and forming continuous paths for conduction of heat away from said surface area, with a relatively high electrical resistance between facing surfaces of said metallic members to provide low electrical conductivity in a direction generally parallel to said surface.

14. In electrical apparatus as defined in claim 13, said current source being a pulse source for passing a current pulse of high intensity and of short duration for rapidly heating and melting said internal zone of said portion of the work piece.

15. In a method of treating a work piece, using a heat sink material having a high heat conductivity in one direction and a low electrical conductivity in a transverse direction, the step of passing current through a portion of the work piece to heat an internal zone thereof while engaging the heat sink material with a surface area of the work piece generally parallel to current flow through said portion, the heat sink material being oriented to provide high heat conductivity in a direction transverse to said surface area and low electrical conductivity in a direction parallel to said surface area.

16. In apparatus as defined in claim 1, said work piece being a member to be electro-forged and said heat sink material being in the form of a die surrounding said work piece.

References Cited by the Examiner

UNITED STATES PATENTS

| | | | |
|---|---|---|---|
| 1,247,741 | 11/1917 | Taylor | 219—86 |
| 1,259,275 | 3/1918 | Murray | 219—152 |
| 1,514,335 | 11/1924 | Phelps et al. | 219—151 |
| 2,023,085 | 12/1935 | Lavallee | 219—104 |
| 2,137,909 | 11/1938 | Hagedorn | 219—86 |
| 2,232,450 | 2/1941 | Hagedorn | 219—86 |
| 2,233,526 | 3/1941 | Hagedorn | 219—86 |
| 2,261,694 | 11/1941 | Meenen | 219—81 |
| 2,300,700 | 11/1942 | Porter et al. | 219—86 |

FOREIGN PATENTS

| | | |
|---|---|---|
| 302,064 | 12/1928 | Great Britain. |

RICHARD M. WOOD, *Primary Examiner.*